United States Patent [19]
Patel et al.

[11] Patent Number: 5,260,676
[45] Date of Patent: Nov. 9, 1993

[54] DUAL WOUND TRIP SOLENOID

[75] Inventors: Umesh C. Patel, Coraopolis; Jere L. McKee, New Sewickley Twp., Butler County, both of Pa.

[73] Assignee: Westinghouse Electric Corp., Pittsburgh, Pa.

[21] Appl. No.: 911,246

[22] Filed: Jul. 6, 1992

Related U.S. Application Data

[63] Continuation of Ser. No. 676,150, Mar. 27, 1991, abandoned.

[51] Int. Cl.$^5$ ............................................. H01H 73/00
[52] U.S. Cl. ..................................... 335/18; 335/132
[58] Field of Search ......................... 335/132, 202, 18; 361/42-50

[56] References Cited

U.S. PATENT DOCUMENTS

| | | |
|---|---|---|
| Re. 30,678 | 7/1981 | Van Zeeland et al. |
| 3,548,259 | 12/1970 | McDonald ............................ 361/45 |
| 3,852,642 | 12/1974 | Engel et al. |
| 3,898,528 | 8/1975 | Runtsch et al. ...................... 361/50 |
| 3,999,103 | 12/1976 | Misencik et al. |
| 4,015,169 | 3/1977 | Misencik |
| 4,020,396 | 4/1977 | Gambale et al. ...................... 335/18 |
| 4,081,852 | 3/1978 | Coley et al. |
| 4,208,688 | 6/1980 | Misencik et al. |
| 4,288,768 | 9/1981 | Arnhold et al. ...................... 335/18 |
| 4,641,217 | 2/1987 | Morris et al. ........................ 361/45 |
| 4,884,048 | 11/1989 | Castonguay et al. ................. 335/18 |

OTHER PUBLICATIONS

Raytheon Publication, Linear Integrated Circuits 1989, Section 10, pp. 10-16 through 10-21.

*Primary Examiner*—Lincoln Donovan
*Attorney, Agent, or Firm*—M. J. Moran

[57] ABSTRACT

A multiple-pole ground fault interrupter, enclosed in an insulated housing, formed with multiple compartments, includes ground fault detection circuitry for detecting ground fault current that can be a personnel hazard. The ground fault interrupter includes a single trip solenoid assembly having multiple windings, each winding corresponding to one of the poles. The trip solenoid is mounted on a printed circuit board and electrically connected to the ground fault detection circuitry disposed thereon. The printed circuit board together with the trip solenoid assembly is disposed in a single compartment which reduces the amount of interconnection wiring between compartments, which, in turn, results in a reduced cost to manufacture the device. The use of a single trip solenoid assembly also results in the use of less components which further reduces the cost of manufacturing the device.

2 Claims, 6 Drawing Sheets

DUAL WOUND TRIP SOLENOID

This application is a continuation of application Ser. No. 07/676,150 filed Mar. 27, 1991, now abandoned.

BACKGROUND OF THE INVENTION

1. Field of the Invention

The present invention relates to a ground fault interrupter and more particularly to a multiple-pole circuit breaker having ground fault detection circuitry which includes a single trip solenoid with multiple windings.

2. Description of the Prior Art

Ground fault interrupters are generally known in the art. Examples of such devices are disclosed in U.S. Pat. Nos. 3,852,642; 3,999,103; 4,015,169; 4,081,852 and 4,208,688, assigned to the same assignee as the present invention, hereby incorporated by reference. Ground fault interrupters are typically used for personnel protection against ground faults near swimming pools, marinas, outdoor receptacles and the like.

Such devices include single and multiple-pole circuit breakers which include one or more pairs of separable main contacts actuated by an operating mechanism, responsive to thermal and magnetic tripping means for tripping the separable main contacts during overload and short circuit conditions. An example of a single-pole ground fault interrupter is disclosed in U.S. Pat. No. 4,081,852. Examples of multiple-pole circuit breakers are disclosed in U.S. Pat. Nos. 3,999,103; 4,015,169 and 4,208,688. Ground fault detection circuitry is also incorporated to form a ground fault interrupter to additionally trip the separable main contacts during a ground fault condition at electrical current levels substantially less than the threshold tripping levels of the thermal and magnetic tripping means to prevent personnel hazards attendant to ground faults.

The ground fault detection circuitry typically includes a current monitor, such as differential transformer, for monitoring any current imbalance between the line conductors and the neutral conductor, indicative of a ground fault, an amplifier and a shunt trip. The differential transformer normally includes one or more a toroids with secondary windings. The line and neutral conductors are passed through the core of the toroid. During normal conditions, the current through the line and neutral conductors generates equal and opposite magnetic fields which cancel and thus do not induce a voltage in the secondary winding of the toroid. However, in the event of a ground fault, the electrical current in the line and neutral conductors is unequal causing a resultant magnetic field which induces a voltage in the secondary winding of the toroid, which, in turn, is amplified and utilized to actuate the shunt trip to trip the circuit breaker separable main contacts.

In the event of a ground fault condition, all of the poles of the circuit breaker are tripped concurrently by the shunt trip, which generally consists of a plurality of trip solenoids with reciprocally mounted plungers interlocked with the circuit breaker operating mechanisms for each pole. More specifically, one trip solenoid is provided for each pole and interlocked with the operating mechanism for that pole. Mechanical interlocking is also provided between the poles to trip all of the poles concurrently.

Ground fault interrupters are disposed in an insulated housing, adapted to be received in a standard circuit breaker panelboard. The housing is formed with side-by-side compartments, separated by partition walls. The circuit breaker components (e.g., main contacts and operating mechanisms) are disposed in one or more of the compartments while the ground fault detection and trip circuitry are disposed in the balance of the compartments. In known multiple-pole ground fault interrupters, the trip solenoids for each pole are disposed in a separate compartments due to their size. Therefore, a two pole ground fault interrupter generally requires four compartments. The circuit breaker components are disposed in two compartments while the trip solenoids for both poles as well as the balance of ground fault detection circuitry are disposed in the other two compartments.

Since the trip solenoids are disposed in different compartments, interconnection wiring must be provided between the compartments. In some known ground fault interrupters, such as the ground fault interrupters disclosed in U.S. Pat. No. 3,999,103, such interconnecting wiring is done by hand which increases the labor cost to manufacture the device. More specifically, in such ground fault interrupters, the ground fault detection circuitry used to actuate the trip solenoids is generally formed from discrete electrical components that are hand soldered with appropriate interconnections made between compartments for the trip solenoids. Such hand wiring and soldering results in relatively high labor costs to manufacture the device. Moreover, such assembly results in relatively tightly compacted compartments which further adds to the labor time to assemble the device.

SUMMARY OF THE INVENTION

It is an object of the present invention to solve the problems associated with the prior art.

It is another object of the present invention to reduce the manufacturing cost of ground fault interrupters.

It is yet a further object of the present invention to reduce the amount of hand wiring between compartments.

It is yet a further object of the present invention to reduce the number of components of multiple-pole ground fault interrupters to further reduce the cost of manufacturing the device.

It is yet a further object of the present invention to provide multiple-pole ground fault interrupter which includes a trip solenoid assembly having multiple windings wound on a single core corresponding to both poles of the circuit breaker.

Briefly, the present invention relates to a multiple-pole ground fault interrupter disposed in a housing adapted to be received in a standard circuit breaker panelboard. In order to reduce the manufacturing cost of the device, a trip solenoid assembly with multiple windings wound about a single core is provided. The trip solenoid assembly is mounted on a printed circuit board and electrically connected to the ground fault detection circuitry formed thereon. The printed circuit board including the trip solenoid assembly is disposed in a single compartment which reduces interconnecting wiring between compartments, which, in turn, reduces the manufacturing cost of the device. The single trip solenoid with multiple windings also results in a reduced number of components which further reduces the manufacturing cost.

DESCRIPTION OF THE DRAWING

These and other objects and advantages of the present invention will become readily apparent from the following description and accompanying drawing, wherein.

DETAILED DESCRIPTION OF THE DRAWING

Figure 1:
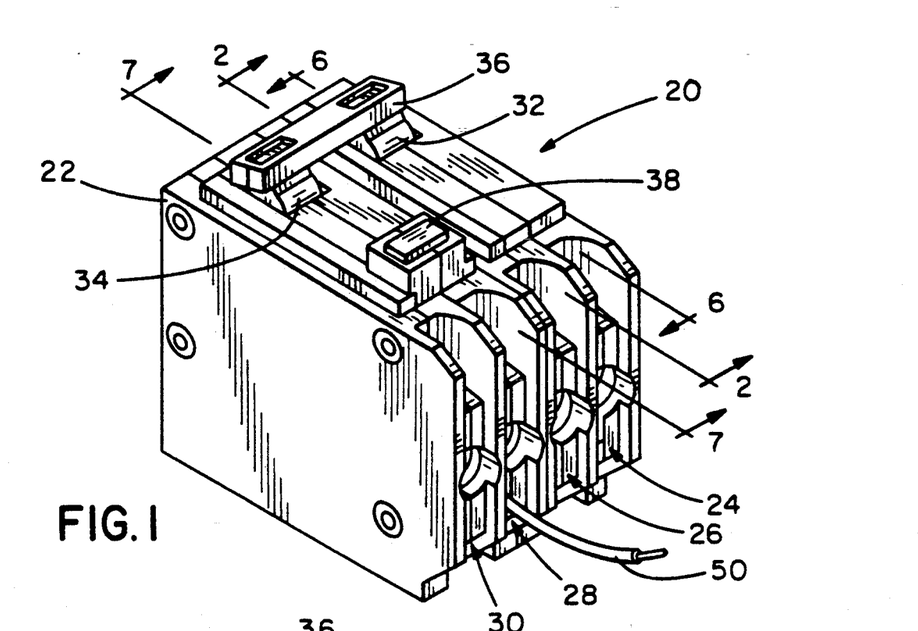
FIG. 1 is a perspective view of a multiple-pole ground fault interrupter in accordance with the present invention.

The multiple-pole ground fault interrupter in accordance with the present invention is generally identified with the reference numeral 20. The ground fault interrupter includes an insulated housing 22, dimensioned to be received in a standard circuit breaker panelboard. The housing 22 is partitioned into a plurality of compartments 24, 26, 28 and 30. In the two pole configuration shown in FIG. 1, compartments 26 and 30 are circuit breaker compartments, while compartments 24 and 28 house the ground fault detection circuitry.

It is also contemplated to form the ground fault interrupter 20 with the circuit breaker compartments disposed as the outside compartments 24 and 30 and the ground fault detection circuitry disposed in the inside compartments 26 and 28. Moreover, it is further contemplated to dispose the ground fault detection circuitry in a single double size compartment in place of the two single size compartments 26 and 28. It should be clear that such variations are within the scope of the present invention. However, for simplicity, the ground fault interrupter 20 is described and illustrated with four compartments 24, 26, 28 and 30 with the ground fault protection circuitry disposed in compartments 24 and 28 and the circuit breakers disposed in compartments 26 and 30. A detailed description of the compartments 24, 26, 28 and 30 is disclosed in U.S. Pat. No. 3,999,103, assigned to the same assignee as the present invention, hereby incorporated by reference.

The ground fault interrupter 20 further includes an operating handle 32 and 34 for each pole of the circuit breaker disposed in compartments 26 and 30. In order to allow for concurrent operation of both poles of the circuit breaker, the operating handles 32 and 34 may be mechanically interlocked by a lever 36, rigidly attached to both operating handles 32 and 34.

In order to allow for periodic testing of the ground fault interrupter 20, a test button 38 is provided external to the housing 22, adjacent the operating handles 32 and 34. The operation of the test button 38 will be described below in connection with FIG. 10.

As described in detail in U.S. Pat. Nos. 3,999,103 and 4,081,852, hereby incorporated by reference, the ground fault interrupter 20 is adopted to be plugged into a standard panelboard (not shown) and connected to an external electrical circuit (not shown). It should also be understood by those of ordinary skill in the art that the principles of the present invention are also applicable to ground fault interrupters that are adapted to be wired or bolted to a standard panelboard. For simplicity, only a plug-in type ground fault interrupter 20 is described and illustrated. More specifically, the line side of the ground fault interrupter 20, indicated by the reference numeral 40, includes a line side terminal assembly 41 for each pole to allow the ground fault interrupter 20 to be plugged into a standard panelboard. The line side terminal assembly 41 includes a rigid conductor 42 (FIGS. 2, 3 and 4) disposed in electrical contact with a stab 44, formed as a generally U-shaped conductor defining resilient depending fingers (not shown), adapted to be plugged into a standard panelboard. A load side terminal assembly 46 (FIGS. 2, 3, 4 and 9) is provided on the load side 48 of the ground fault interrupter to allow the device to be connected to an external electrical circuit. Additionally, a neutral conductor, formed as a pigtail 50 (FIG. 1), is provided on the load side 48 of the ground fault interrupter 20. The pigtail 50 is adapted to be connected to the neutral bus (not shown) in the panelboard.

The two poles of the circuit breaker, generally identified with the reference numeral 52, disposed in compartments 26 and 30 are essentially identical, therefore, only the pole disposed in compartment 26 is described and illustrated. Moreover, the operation of the circuit breaker 52 is described in detail in U.S. Pat. Nos. 3,999,103 and 4,081,852, hereby incorporated by reference. Therefore, the operation of the circuit breaker 52 will only be described to the extent necessary to provide an understanding of the present invention.

Figure 2:
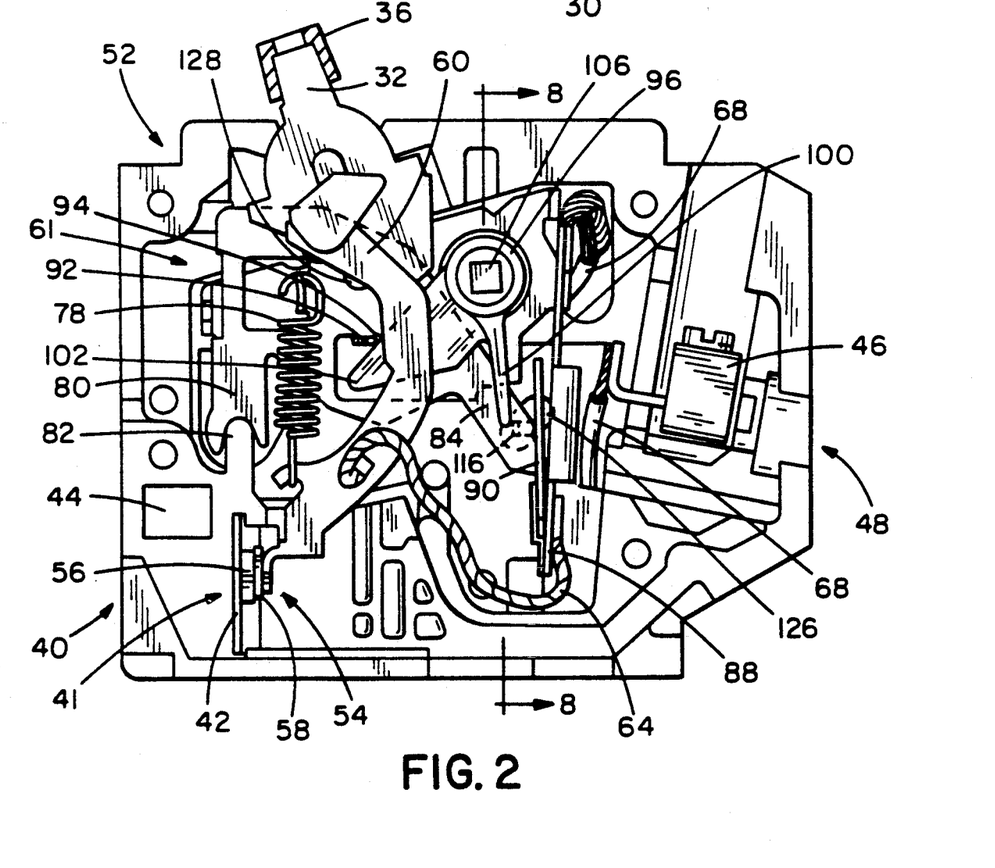
FIG. 2 is a cross-sectional view along line 2—2 of FIG. 1 illustrating one of the circuit breaker assemblies in an on position.
Figure 3:
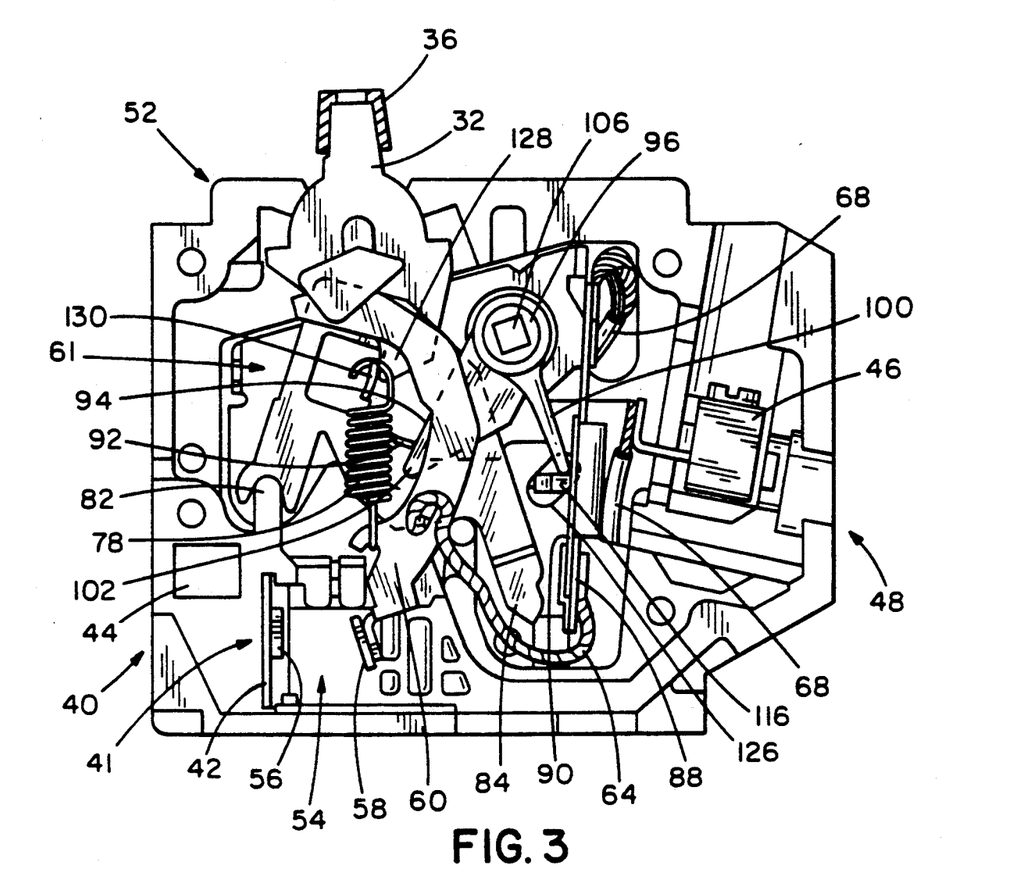
FIG. 3 is similar to FIG. 2 and illustrates the circuit breaker assembly in a trip position.
Figure 4:
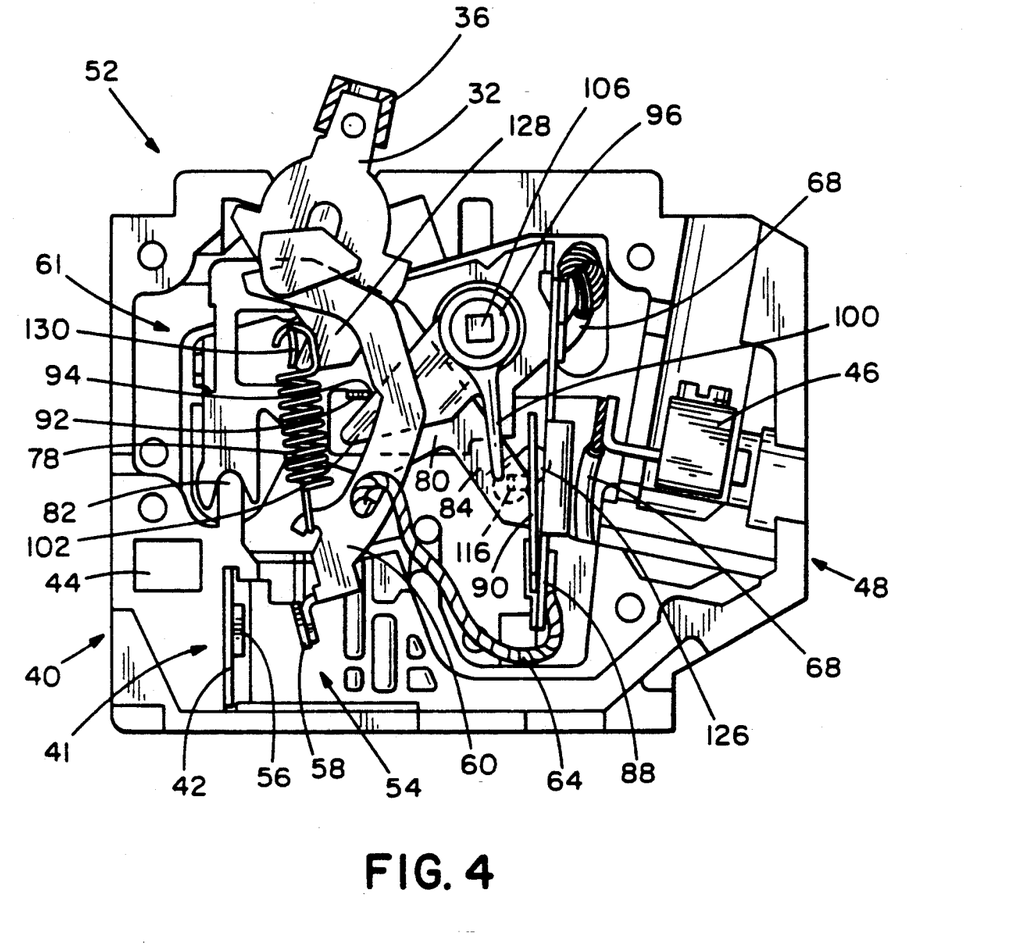
FIG. 4 is similar to FIG. 2 and illustrates the circuit breaker assembly in an off position.

The circuit breaker 52 is illustrated in each of its operating positions. More specifically, FIG. 2 illustrates the circuit breaker 52 in an on position. FIG. 3 illustrates the circuit breaker 52 in a trip position while FIG. 4 illustrates the circuit breaker 52 in an off position.

The circuit breaker 52 includes a pair of separable main contacts 54 which includes a stationary mounted main contact 56, disposed in electrical contact with the rigid conductor 42 and a movably mounted main contact 58. The movably mounted main contact 58 is mounted to a movably mounted contact arm 60. The movably mounted contact arm is under the control of the operating handle 32 and an operating mechanism 61 which includes a latch assembly 62. The operating handle 32 allows the circuit breaker 52 to be operated manually to allow selective placement of the circuit breaker 52 in the on condition (FIG. 2) or alternatively in the off position (FIG. 4). During overload and ground fault conditions, the latch assembly 62 automatically operates the movably mounted main contact arm 60 to separate the main contacts 54.

Figure 7:
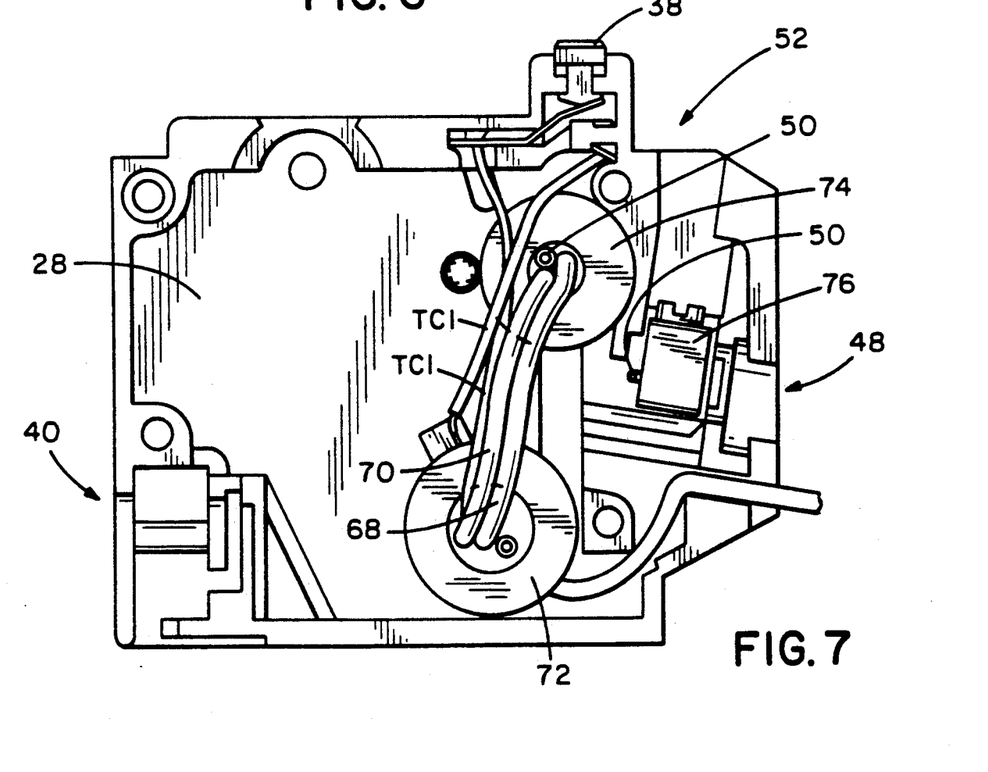
FIG. 7 is a sectional view along line 7—7 of FIG. 1 illustrating another compartment within the ground fault interrupter housing in accordance with the present invention.

A flexible conductor 64 is electrically connected between the movably mounted contact arm 60 and one end of a bimetal assembly 66. The other end of the bimetal assembly 66 is electrically connected to the load side terminal assembly 46 by way of a flexible conductor 68. The flexible conductor 68 corresponding to the pole of the circuit breaker 52 disposed in compartment 26 along with a flexible conductor 70 (FIGS. 7 and 10), corresponding to the pole of the circuit breaker 52 disposed in compartment 30 (FIGS. 1 and 7) are routed to compartment 28 through toroids 72 and 74 (FIG. 7) and back to their respective compartments 26 and 30 and terminated to their respective load side terminal assemblies 46. Additionally, the neutral conductor 50 (FIGS. 1 and 7), that is connected to the neutral bus in the panelboard which extends outwardly from the compartment 50 (FIG. 1), is also routed through the toroids 72 and 74 in compartment 28 as best shown in FIG. 7 and terminated to a neutral conductor load side terminal assembly 76.

The movably mounted contact arm 60 is rotatably mounted relative to the operating handle 32. An operating spring 78 is connected between the movably mounted contact arm 60 and the latch assembly 62. During normal conditions, the latch assembly 62 is in a latched position as shown in FIGS. 2 and 4 and the movably mounted contact arm 60 is under the control of the operating handle 32 to allow the separable main contacts 54 to selectively be placed in an on position (FIG. 2) or an off position (FIG. 4).

During overload and ground fault conditions, the movably mounted contact arm 60 is under the control of the latch assembly 62. The latch assembly 62 includes a latch member 80, pivotally mounted about a fixed pivot 82 formed in the housing 22. The latch member 80 includes an extending finger 84 (FIGS. 1, 3, 4 and 8) on one end, received in an aperture 86 (FIG. 8) in the bimetal assembly 66 forming a latch.

The bimetal assembly 66 provides overload protection and includes two metal strips 88 and 90 bonded together at one end. The strips 88 and 90 are selected with different rates of thermal expansion. Heat due to overload condition will cause the strip 90 to deflect in a clockwise direction (FIGS. 2, 3 and 4) which, in turn, releases the latch member 80 causing it to rotate in a clockwise direction about the fixed pivot 82. The latch member 80 is formed with an upstanding actuation finger 92 that engages the movably mounted contact arm 60 at the point 94 (FIGS. 2, 3 and 4) when the latch member 80 is released causing the movably mounted contact arm 60 to rotate in a counterclockwise direction (FIGS. 2, 3 and 4) under the influence of the operating spring 78, thus separating the separable main contacts 54.

Figure 8:
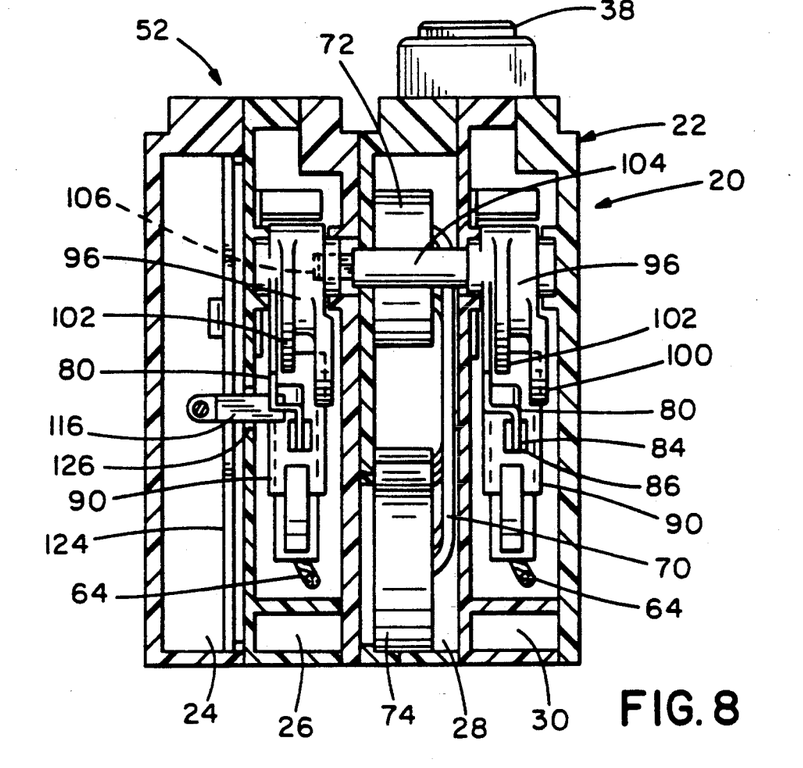
FIG. 8 is a sectional view along line 8—8 of FIG. 2 of the ground fault interrupter in accordance with the present invention.

In order to trip both poles of the circuit breaker 52 concurrently, each pole is provided with an actuator 96, pivotally mounted about a fixed pivot 98. The actuator 96 is formed with two levers 100 and 102, angularly spaced apart relative to the pivot 98. The actuators 96 for each pole of the circuit breaker 52 are connected together by a shaft 104 (FIG. 8). More specifically, each actuator 96 is provided with a square aperture 106 (FIGS. 2, 3 and 4). The shaft 104 is provided with squared ends to force the actuators 96 to rotate in unison. Thus, any time the latch assembly 62 is released for one pole, the other pole is also tripped by way its actuator 96 and the connecting shaft 104. More specifically, one lever 100 is disposed adjacent the metal strip 90 of the bimetal assembly 66. The other lever 102 is disposed adjacent actuation finger 92, formed on the latch member 80. Thus, any time the latch member 80 rotates in a clockwise direction, the actuation finger 92 engages the lever 102 causing it to rotate in a counterclockwise direction (FIGS. 2, 3 and 4). This causes the lever 100 to deflect the metal strip 90 to release the latch assembly 62 which, in turn, causes the main contacts 54 to be separated. Since the actuators 96 for the two poles are connected together by way of the shaft 104, any time one pole is tripped, the other pole will also be tripped. Thus, during overload conditions, the bimetal assembly 66 causes the latch member 80 to be released, which, in turn, trips both poles.

Figure 5:
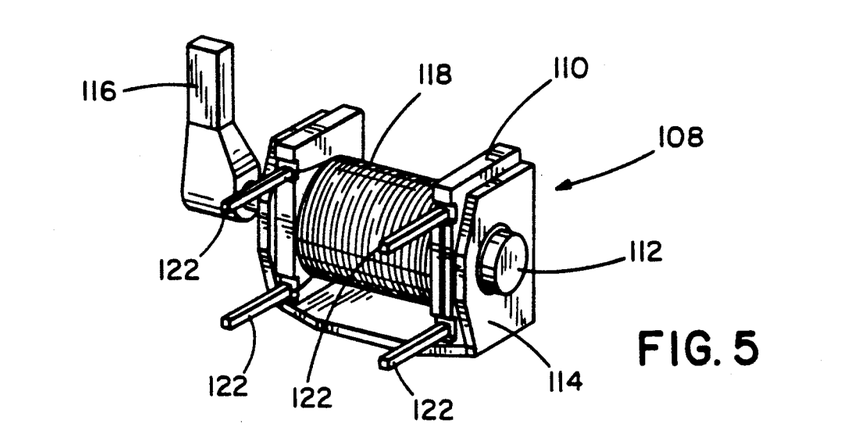
FIG. 5 is a perspective view of a multiple wound trip solenoid assembly in accordance with the present invention.

During ground fault conditions, a trip solenoid assembly 108 (FIGS. 5, 6, 7 and 8) is used to deflect the metal strip 90 to release the latch assembly 62 to cause both poles of the circuit breaker 52 in the same manner as described above. The trip solenoid assembly 108 is formed with multiple windings disposed on a single bobbin and frame. More specifically as best shown in FIG. 5, the trip solenoid assembly 108 includes an insulated bobbin 110, formed, for example, from a material such as, VALOX 420 SEO, with a reciprocally mounted plunger 112, disposed in a U-shaped frame 114. A trip bar 116 is disposed on a free end of the plunger 112. The trip bar 116 may be formed from a material, such as MONSANTO M 340. Both windings, identified with the reference numerals 118 and 120 (FIG. 10), are wound about the bobbin 110 forming multiple wound trip solenoid assembly 108. The windings 118 and 120 may be formed from, for example, #39 AWG magnet wire with double build polyurethane with a nylon overcoat rated for 130° C. Each coil 118, 120 may be wound with approximately 825 turns defining a coil resistance of around 55 ohms. The windings 118 and 120 are terminated to terminal pins 122, rigidly disposed relative to the ends of the bobbin 110. The terminal pins 122 allow the trip solenoid assembly 108 to be terminated to a printed circuit board 124 (FIG. 6) for connection to the ground fault detection circuitry.

The printed circuit board 124 is mounted in compartment 24, adjacent the circuit breaker compartment 26. Since both coils of the trip solenoid assembly 108 are disposed in a single compartment, interconnection wiring to the trip solenoids is eliminated thus reducing the labor cost and consequently the manufacturing cost of the device. Moreover, the use of a single trip solenoid assembly reduces the number of components required and, thus further reduces the manufacturing cost of the device.

Figure 6:
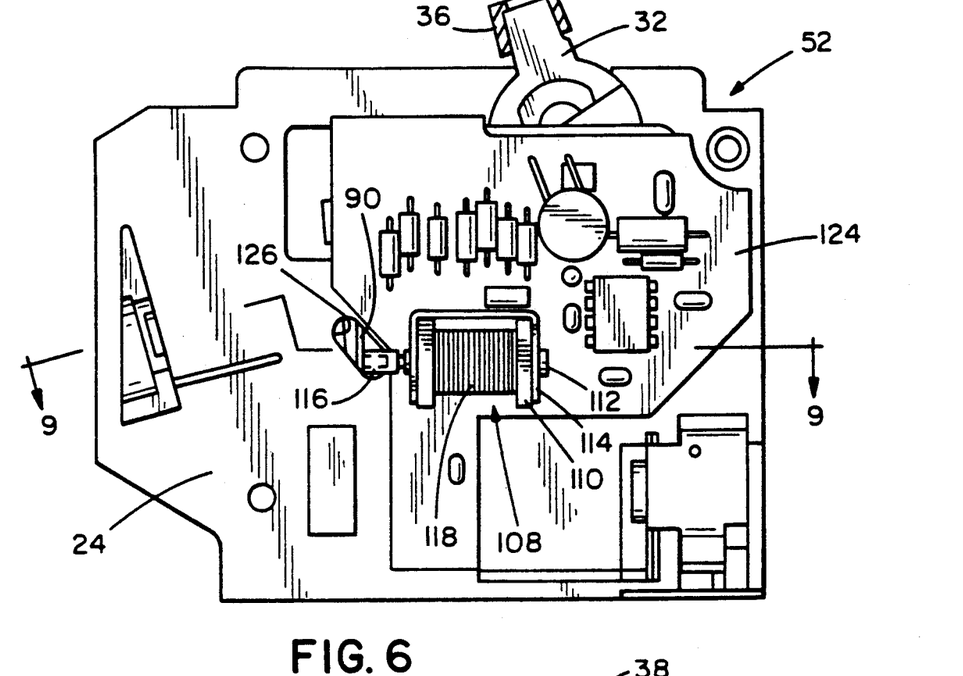
FIG. 6 is a sectional view along line 6—6 of FIG. 1 illustrating the trip solenoid illustrated in FIG. 5 mounted on a printed circuit board and disposed in a single compartment in the ground fault interrupter in accordance with the present invention.
Figure 9:
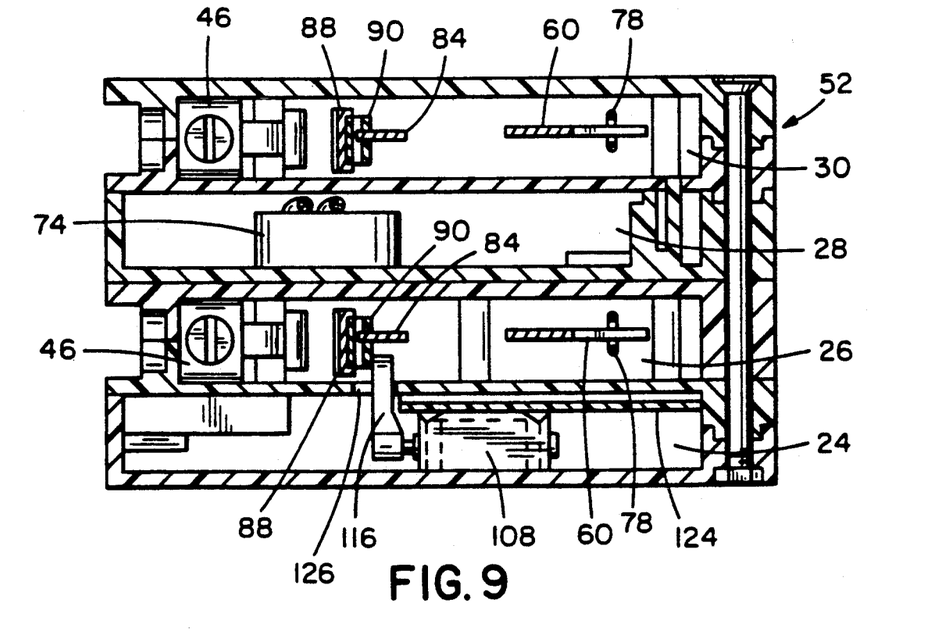
FIG. 9 is a sectional view along line 9—9 of FIG. 6, of the ground fault interrupter in accordance with the present invention.
Figure 10:
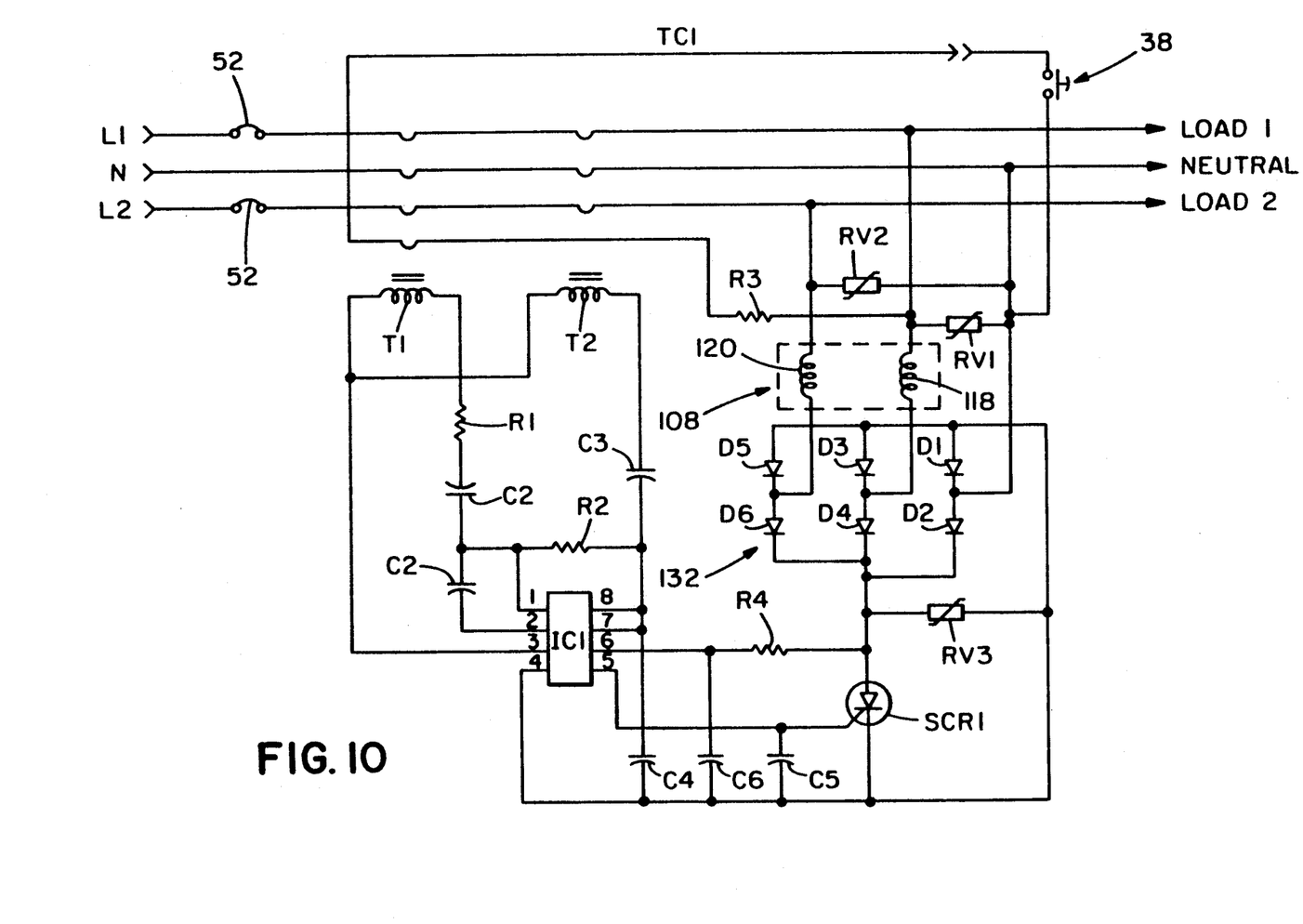
FIG. 10 is a schematic diagram of a multiple-pole ground fault interrupter in accordance with the present invention.

With the exception of the toroids 72 and 74, the ground fault detection circuitry illustrated, for example, in FIG. 10, is disposed on the printed circuit board 124 along with the trip solenoid assembly 108 and disposed in compartment 24 of the housing 22. As best shown in FIGS. 6, 8 and 9, the trip bar 116 is disposed in a slot 126 formed in the wall of the compartment 26, such that the trip bar 116 is disposed adjacent the metal strip 90 of the bimetal assembly 66. Upon detection of a ground fault, the trip solenoid assembly 108 is energized causing the trip bar 116 to deflect the metal strip 90, which, in turn, releases the latch assembly 62 in the manner described above to trip the separable main contacts 54.

After the latch assembly 62 has been released, whether by the ground fault detection circuitry or by the bimetal assembly 66, the operating handle 32 must be placed in the off position to reset it. More specifically, the operating handle 32 includes an extending surface 128 that is adapted to engage an extending finger 130 on the latch member 80 to which the operating spring 78 is attached. When the operating handle 32 is moved to the off position (FIG. 4), the extending surface 128 on the operating handle 32 engages the extending finger 130 on the latch member 80 and causes the latch member to rotate in a counterclockwise direction (FIGS. 2, 3 and 4) until the extending finger 84 on the latch member 80 is received in the aperture 86 in the bimetal assembly 66, thus resetting the latch assembly 62.

The ground fault detection circuitry as illustrated schematically in FIG. 10. As shown, the circuit is illustrated for a two pole ground fault interrupter, however, it should be clear that the principles of the invention are applicable to other than two pole ground fault interrupters.

The circuitry includes the sensing toroids 72 and 74 with secondary windings T1 and T2, respectively. As previously discussed, the line conductors L1 and L2 as well as the neutral conductor N is routed through the toroids 72 and 74. Additionally, a test conductor TC1 is routed through the toroid 72.

The toroid 72 is for sensing ground faults. During normal conditions, the magnetic fields generated by the conductors L1 and L2 and the neutral conductor N cancel and therefore do not induce a voltage on the secondary winding T1 of the toroid 72. However, during a ground fault condition, there will be a resultant magnetic field which will induce a voltage in the secondary winding T1 which, in turn, will energize the trip solenoid assembly 108 by way of the ground fault interrupter integrated circuit IC1, as discussed below and the trip the circuit breaker 52 as discussed below.

The toroid 74 is for sensing a grounded neutral condition. As discussed in Linear Integrated Circuits 1989 by Raytheon Corporation, in Section 10 on pages 10-16 through 10-21, hereby incorporated by reference, a grounded neutral will close a magnetic path between the toroids 72 and 74. The resultant AC coupling closes a feedback path around an operational amplifier in the IC1 causing the operational amplifier to oscillate. When the peaks of the oscillation voltage exceed an SCR trigger comparator threshold within the IC1, the IC1 output will go high. Circuitry for detecting a grounded neutral condition is also disclosed in Reissue Patent No. 30,678, hereby incorporated by reference.

The secondary windings T1 and T2 of the toroids 72 and 74, respectively, are applied to a low power ground fault interrupter integrated circuit IC1, such as a Raytheon RV4145 or a TRC-10020 by Technology Research Corporation of Clearwater, Fla. More specifically, one side of the secondary winding T1 is applied to pin 3 of the integrated circuit IC1. The other side of the secondary winding T1 is applied to pin 1 of the IC1 by way of the resistor R1 and serially coupled capacitor C1. A resistor R2 is connected between pins 1 and 8 of the integrated circuit IC1. The resistors R1 and R2 determine amplification factor for an operational amplifier within the integrated circuit IC1. Exemplary values for the resistors R1 and R2 are 150 ohms and 1 megohm, respectively. The capacitor C1 which may be, for example, 15 microfarads acts as a coupling capacitor. A noise capacitor C2, for example, 0.01 microfarads is connected between pins 1 and 2 of the integrated circuit IC1.

One side of the secondary winding T2 is connected to the secondary winding T1 that is connected to pin 3 of the integrated circuit IC1. The other side of the secondary winding T2 is connected to a tuning capacitor C3, for example, 1 microfarad. The other side of the tuning capacitor C3 is connected to the resistor R2, pins 7 and 8 of the integrated circuit IC1 as well as to a noise capacitor C4, for example, 0.01 microfarads. The other side of the noise capacitor C4 is connected to pin 4 of the integrated circuit IC1.

The windings 118 and 120 of the trip solenoid assembly 108 are connected on one end to the line conductors L1 and L2, respectively with the other end connected to a full wave rectifier, generally indicated by the reference numeral 132. The full wave rectifier includes the diodes D1, D2, D3, D4, D5 and D6, connected as shown, provides full wave rectification from either line conductor L1 or L2. The output of the full wave rectifier 132 is connected across a silicon controlled rectifier SCR 1. The gate terminal of the silicon controlled rectifier SCR 1 is connected to pin 5 of the integrated circuit IC1. A noise capacitor C5, for example 6.8 microfarads is connected between the gate terminal of the silicon controlled rectifier SCR 1 and pin 4 of the integrated circuit IC1 to prevent spurious triggering of the silicon controlled rectifier SCR 1.

A resistor R6, for example 30 kilohms, is connected between full wave rectifier 132 and pin 6 of the integrated circuit IC1. The resistor R6 limits the current to the shunt regulator within the integrated circuit IC1.

Surge protective devices, such as the varistors RV1, RV2 and RV3 are used to protect the circuit from overvoltage. More specifically, the varistor RV1 is connected between the load conductor LOAD 1 and the load neutral. The varistor RV2 is connected between the load conductor LOAD 2 and the load neutral. The varistor RV3 is connected across the silicon controlled rectifier SCR 1.

In operation, upon detection of a grounded load conductor or a grounded load neutral conductor by the toroids 72 or 74, a voltage is induced in the secondary windings T1 and T2. This voltage, in turn, is applied to the integrated circuit IC1. During such conditions, pin 5 of the integrated circuit IC1 enables the gate terminal to fire the silicon controlled rectifier SCR 1, which, in turn, energizes one or both coils 118 and 120 of the trip solenoid assembly 108 to trip the circuit breaker 52 which, in turn, causes the trip bar 116 to trip the circuit breaker in the manner discussed above.

In order to allow for periodic verification of the operation of the circuitry, a test circuit is included which includes the test button 38, accessible from the outside of the housing 22. More specifically, the load neutral conductor is connected to a load conductor by way of the test button 38 and a resistor R3, for example 15 kilohms, and routed through the toroid 72 (FIG. 7) to induce a signal in the secondary winding T1 to simulate a ground fault condition. The test button 38 is provided with a momentary contact. Upon actuation of the test button 38, a ground condition is simulated, resulting in a trip of the circuit breaker 52.

Many modifications and variations of the present invention are possible in light of the above teachings. Thus, it is to be understood that, within the scope of the appended claims, the invention may be practiced otherwise than as specifically described hereinabove.

What is claimed and desired to be secured by letters patent of the United States is:

1. A ground fault interrupter, comprising:
   an insulated housing partitioned into a plurality of compartments;
   a plurality of electrical conductors;
   a separate pair of separable main contacts interconnected with separate ones of said electrical conductors, each pair of said separable main contacts disposed in a different one of said plurality of compartments;
   separate operating mechanisms for actuating each of said separate pairs of separable main contacts, each operating mechanism disposed in the same one of said plurality of compartments as the pair of separable main contacts with which said operating mechanism is associated; and
   means for sensing a ground fault including means for actuating said operating mechanisms which includes a solenoid disposed in a single other compartment of said housing;
   said solenoid having a movable magnetic member mechanically connected to said two operating mechanisms in said different ones of said plurality of compartments and magnetically actuable in response to said ground fault, and a plurality of solenoid windings any of which when electrically energized will cause the magnetic actuation of said movable magnetic member, each of said solenoid windings being interconnected electrically at one side thereof with said sensing means, each of said solenoid windings being interconnected electrically at the other side thereof with a separate one of said electrical conductors, electrical energization of each said solenoid winding occurring when electrical energy flows between said sensing means and said electrical conductor to which said other side is electrically interconnected in response to said ground fault so that said magnetic member will be actuated when electrical energy flows between said sensing means and any of said interconnected electrical conductors for tripping both pairs of said separable main contacts.

2. A two pole ground fault interrupter, comprising:
   an insulating housing formed with a plurality of partitions defining a plurality of compartments;
   two electrical conductors;
   a separate pair of separable main contacts interconnected with separate ones of said electrical conductors;
   two operating mechanisms, one operating mechanism associated with each of said two pairs of separable main contacts, one each of said two pairs of separable main contacts and said two operating mechanisms disposed in one each of said plurality of compartments;
   sensing means for detecting a ground fault including detection circuitry disposed on a printed circuit board and one or more toroids, said one or more toroids disposed in one of said plurality of compartments; and
   means for actuating said two operating mechanisms responsive to said sensing means, including a solenoid, said solenoid disposed in a compartment other than said compartments which include said two operating mechanisms but mechanically interconnected with said two operating mechanisms through said partitions;
   said solenoid having a movable magnetic member which is magnetically actuable in response to said ground fault and a pair of solenoid windings either of which when electrically energized will cause the magnetic actuation of said movable magnetic member, each of said solenoid windings being interconnected electrically at one side thereof with said sensing means, each of said solenoid windings being interconnected electrically at the other side thereof with a separate one of said electrical conductors, electrical energization of each said solenoid occurring when electrical energy flows between said sensing means and said electrical conductor to which said other side is electrically interconnected so that said magnetic member will be actuated when electrical energy flows between said sensing means and any of said interconnected electrical conductors for tripping both pairs of said separable main contacts.

* * * * *